United States Patent [19]
Kutter

[11] Patent Number: 5,455,485
[45] Date of Patent: Oct. 3, 1995

[54] BICYCLE LIGHTING SYSTEM

[76] Inventor: Michael Kutter, Burgweg 15, CH-4058 Basel, Switzerland

[21] Appl. No.: 189,990

[22] Filed: Jan. 31, 1994

[30] Foreign Application Priority Data

Feb. 4, 1993 [CH] Switzerland ............... 00341/93

[51] Int. Cl.$^6$ ................................................. B60Q 1/26
[52] U.S. Cl. ................. 315/78; 315/79; 315/82; 310/37; 310/73
[58] Field of Search ................... 315/76, 77, 78, 315/80, 82, 79; 310/73, 37

[56] References Cited

U.S. PATENT DOCUMENTS 1,241,284  9/1917  Rhoades ......................... 315/78

Primary Examiner—Robert J. Pascal
Assistant Examiner—Reginald A. Ratliff
Attorney, Agent, or Firm—Speckman, Pauley & Fejer

[57] ABSTRACT

A lighting system, in particular for bicycles, which operates in accordance with the principle of a wind generator. The lighting system (1) is mounted at the front of the bicycle above the front wheel. A system comprising a dynamo (2), propeller (3), electrical circuit (6), battery (4) and lighting devices (5) which are adapted to each other permits the illumination of a tail light even when stationary. A voltage monitor and an overload protector are part of the circuit (6).

10 Claims, 2 Drawing Sheets

BICYCLE LIGHTING SYSTEM

FIELD OF THE INVENTION

1. Background of the Invention

This invention relates to a lighting system, particularly suitable for mounting on a bicycle or bicycle-like vehicle, having a dynamo for generating electrical energy and a lamp as the consumer of electrical energy.

2. Description of Prior Art

Bicycles equipped with a dynamo, which is driven by frictional connection to a wheel, are known. Front and rear lamps are directly electrically connected to the dynamo. The dynamo takes energy from the turning wheel for the generation of electricity for the lamps. This energy, which constitutes more than 12% of the pedaling output of an average bicycle rider, must be additionally provided by the rider. Thus, riding becomes considerably more strenuous as soon as the dynamo and the lamps are switched on.

The lamps only provide light while riding, and only if the dynamo is switched on. Bicycles are therefore never lit up when standing still, which can be dangerous in the darkness and also in particular in the rain. Therefore, tests with batteries for storing electrical energy have been conducted. However, because this energy must be additionally generated by pedaling, this has never been successful due to poor efficiency. In addition, because of their weight, suitably small batteries have only a limited effectiveness.

SUMMARY OF THE INVENTION

It is an object of this invention to provide a lighting system suitable for use with a bicycle or other similarly manually powered devices wherein the energy for generating the current required for the lighting device is provided indirectly by the rider. In the process, the efficiency is improved.

This object is attained by a lighting system mountable on a bicycle having a dynamo for generating electrical energy and a lighting device for consuming the electrical energy. The dynamo is operationally connected to an air-driven propeller and electrically connected through an electrical circuit to the lighting device.

An additional advantage of this invention is that excess electrical energy can be stored so that, of the entire lighting device of the bicycle, at least an appropriately designed tail light can continue to be supplied with electrical energy and, thus, lit, even when the bicycle is stationary. This makes the bicycle clearly visible at least from the rear, even when it is stationary.

BRIEF DESCRIPTION OF THE DRAWINGS

The lighting system in accordance with this invention will be better understood from the following detailed description in conjunction with the drawings, wherein.

DESCRIPTION OF PREFERRED EMBODIMENTS

Figure 1:
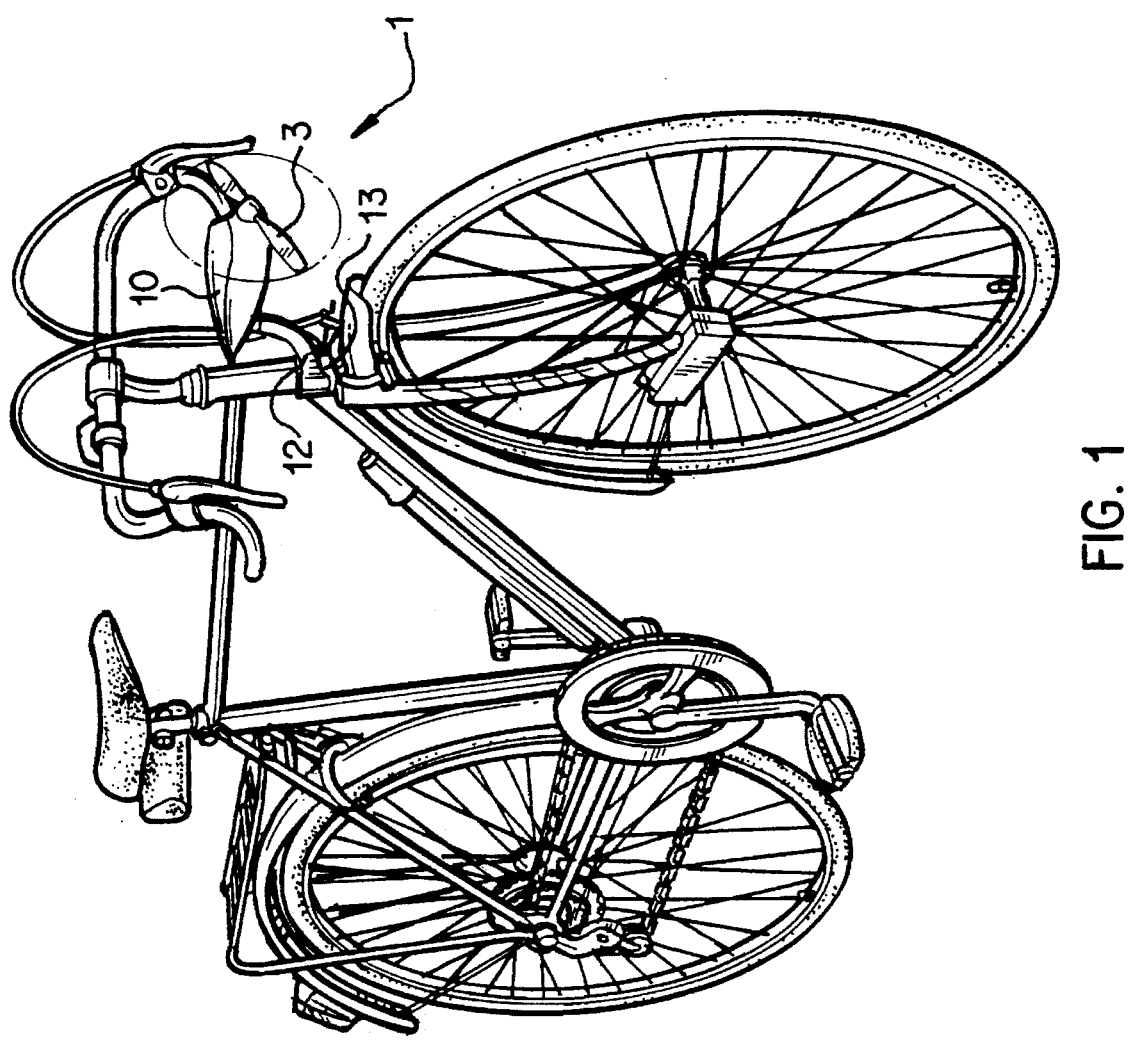
FIG. 1 shows a bicycle with a lighting system in accordance with one embodiment of this invention installed.

A bicycle with a lighting system in accordance with one embodiment of this invention is illustrated in FIG. 1. The lighting system 1 comprising a streamlined housing 10 is disposed above the front wheel of the bicycle and in front of the handlebars. It is fastened to the bicycle frame 13 by a holder 12. Consequently, the lighting system 1 is always in the full air stream during riding, particularly in an approximately undisturbed air flow, and thus assures an optimum use of the air flow by the propeller 3.

Figure 2:
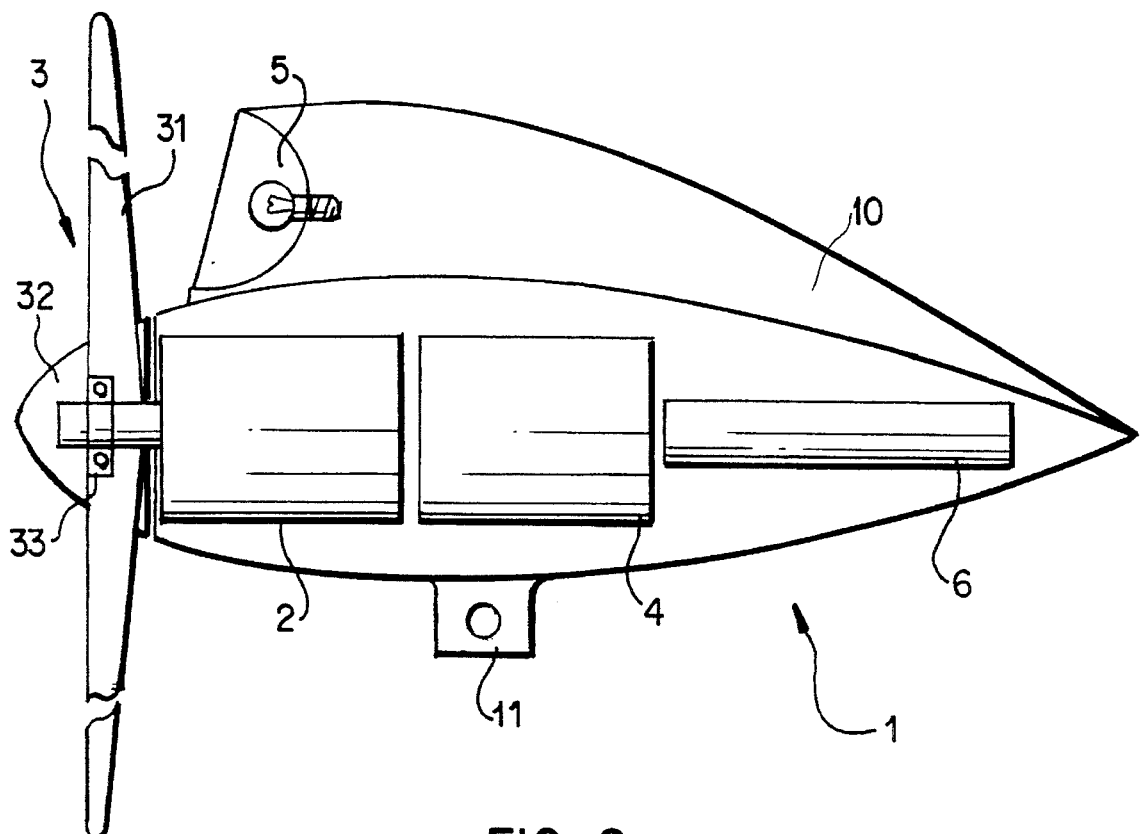
FIG. 2 is a cross-sectional side view of a lighting system in accordance with one embodiment of this invention.

The lighting system 1 is shown schematically in longitudinal section in FIG. 2. A streamlined housing 10 has a bracket 11 on its underside for fastening to the bicycle frame by a holder. The bracket 11 is preferably designed as a quick release of a known type for connection with the holder. A lamp 5 is disposed on the top in a widening of the housing 1. Preferably the lamp 5 is a headlight with a halogen lamp of conventional type. The lamp 5 can also be seated in a separate housing and fastened on the bicycle spatially separated from the housing 10.

A dynamo 2, a battery 4 and an electrical circuit 6 are located in the interior of the housing 10. The rotor shaft of the dynamo is located in the longitudinal direction of the housing 10. A propeller 3 with a diameter of approximately 25 cm is attached to the front of the rotor shaft. The propeller 3 has at least one propeller blade 31. However, use of a double- or a triple-bladed propeller is preferred. The pitch and diameter of the propeller 3 can be adjusted to adapt to the average speed of the rider. Propellers which are employed in model airplane building, for example, may also be used. The center of the propeller is advantageously covered by a spinner 32 which makes a transition in a streamlined manner towards the housing 10. The propeller blades 31 can be pivotably hinged toward the front in the longitudinal axis in the manner of a folding propeller by pivot joints 33 on the rotor shaft 21, thereby facilitating stowing and transporting of the lighting system 1.

Electric motors switched as generators are suitable as dynamos 2 for supplying the lighting device, which operate with a very high degree of efficiency. The battery 4 is disposed behind the dynamo 2. Various types are suitable, such as nickel-cadmium, lead or sulfur-zinc batteries.

The electrical circuit 6 is disposed behind the battery 4 and is preferably embodied on a plate as a printed electronic circuit. It will be described in detail in connection with FIG. 3. The wiring of the dynamo 2, circuit 6 and battery 4 is not drawn, because it can be determined from the circuit 6.

Figure 3:
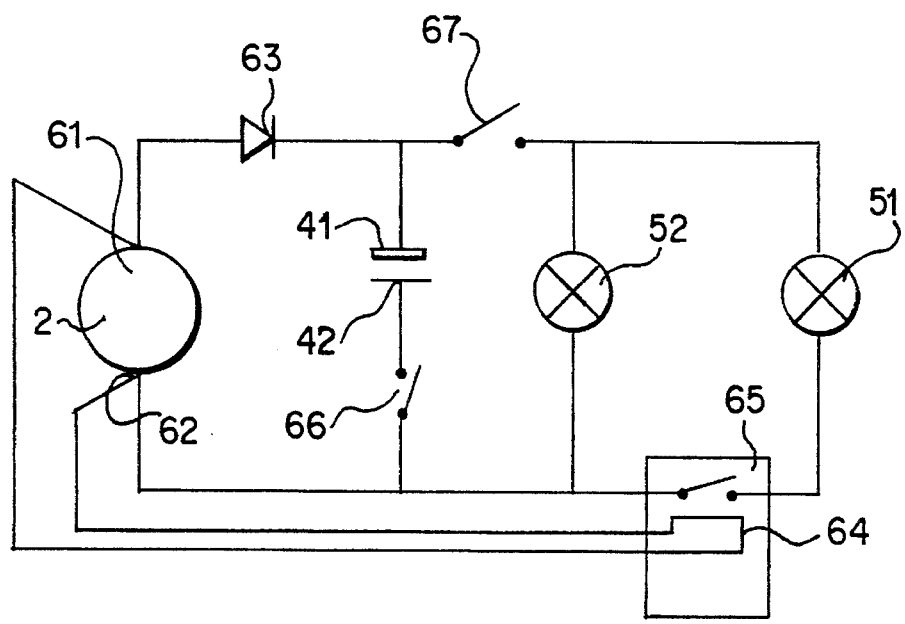
FIG. 3 is a block diagram of an electrical circuitry of the lighting system in accordance with one embodiment of this invention.

A block diagram of the electrical circuit 6 is illustrated in FIG. 3. The first tap 61 on the dynamo 2 leads through a diode 63 to the positive side 41 of the battery 4 and to the lighting device consisting of the headlight 51 and the tail light 52. A master switch 67 for connecting all lights is provided between the battery 4 and the lights. The master switch 67 may contain an overload safety. The second tap 62 on the dynamo 2 leads on the one side through a charging status monitor 66 of a known type to the negative side 42 of the battery 4, and on the other side to the tail light 52 and through a voltage-controlled switch 65 to the headlight 51. The charging status monitor 66 protects the battery 4 from an overcharge and/or excessive discharge. A voltage monitor 64 is also inserted between the first tap 61 and the second tap 62 on the dynamo 2. It is designed in accordance with semiconductor technology in a known manner. It may also alternatively contain a relay. When a preset threshold voltage has been reached at the dynamo 2, the voltage monitor 64 switches the voltage-controlled switch 65 on, thereby closing the circuit through the headlight 51. When the threshold voltage is negatively exceeded, the voltage-controlled switch 65 is released and the circuit through the headlight 51 or possible additional electricity consumers is broken.

In accordance with a preferred embodiment of this invention, a plurality of light-emitting diodes, arranged on a small surface, is provided as the tail light 52 in this circuit. Light-emitting diodes have the advantage of being minimal current users. Although an individual light-emitting diode provides only little light, a planar arrangement of several light-emitting diodes results in the same effect as a conventional tail light for bicycles. Because of the low current consumption, such a tail light 52 can be easily supplied by the battery 4 over a long period of time, even when the bicycle is stationary. In this way, the bicycle is at least illuminated at the rear at night when it is stationary. The result is a considerable reduction of danger in road traffic.

In accordance with one embodiment of this invention, a normal electrical tail light may be used. However, in contrast to light emitting diodes, it must be connected through the voltage-controlled switch 65. As a result, when the bicycle is stationary, the normal electrical tail light does not shine.

The mode of functioning of the lighting system of this invention for bicycles or bicycle-like vehicles is as follows: When needed, the propeller blades are folded open before or during riding and the master switch 67 is turned on. The propeller 3 immediately starts turning in the airflow, thereby turning the dynamo 2.

The propeller takes energy from the airflow ahead of the rider in the direction of flow. Thus, only energy which is lost anyway because of the swirling of the flow is used. The air resistance generated by the lighting system 1 is completely negligible in relation to the total air resistance of the rider and the bicycle. Thus, the bicycle rider need not put out any perceptible extra work.

When the propeller 3 turns, the dynamo 2 generates electrical energy. As soon as the generated voltage is sufficient, the battery 4 is charged through the diode 63, which prevents any backflow of current. After the master switch 67 has been switched on, the light-emitting diodes of the tail light 52 are live and the tail light 52 shines. It is supplied by the battery 4.

As the propeller turns faster and more electrical energy is generated, the voltage at the dynamo 2 increases. When the electrical energy emitted is sufficient and a preset threshold voltage has been reached, the voltage monitor 64 switches the voltage-controlled switch 65 on. In this way, the circuit through the headlight 51 is closed and the headlight gives off light. Possible voltage peaks are interrupted by the internal capacitor of the battery 4 and are used to charge it. The voltage monitor 64 is necessary so that below the threshold voltage, the propeller and the dynamo can run without being under load. If the consumers were always connected to the dynamo 2, it would brake the propeller during starting in such a way that no electrical energy would ever be generated. Possibly the propeller would have to be manually cranked up during travel.

It is possible, using master switch 67, to interrupt the circuit through all consumers so that all the energy generated by the dynamo can be used for charging the battery. In this way the battery 4 can also be charged during the day.

When not in use, the system is interrupted by the master switch 67. If desired, the propeller blades are pivoted forward and protected with a cover or a case which can be pushed over them. To prevent damage or theft, if the housing 10 is appropriately designed, it and the elements housed therein and on it can be simply released from the bicycle frame by a quick release and placed, for example, in a bag and taken along.

It is obvious that the recited lighting system is also capable of functioning without the battery 4. However, the disadvantage is that, as with lighting systems up to now, too little or no current is produced when stationary or moving slowly and, thus, the vehicle is not illuminated.

What is claimed is:

1. In a lighting system for mounting on a manually-powered vehicle, having a dynamo (2) for generating electrical energy and a lighting device (5) as an electrical energy consumer, the improvement comprising: the dynamo (2) operationally connected to a propeller (3) driven by airflow, and the dynamo (2) electrically connected through an electrical circuit (6) to the lighting device (5).

2. In a lighting system in accordance with claim 1, wherein the electrical circuit (6) comprises a voltage monitor (64) of a voltage at the dynamo (2).

3. In a lighting system in accordance with claim 2, wherein the lighting device (5) is automatically turned on and off by a switch (65) which is voltage-controlled by the voltage monitor (64).

4. In a lighting system in accordance with claim 1, wherein a battery (4) is connected to the electrical circuit (6), the electrical circuit (6) comprising a diode (63) which is switchable between the dynamo (2) and the battery (4).

5. In a lighting system in accordance with claim 1, wherein the electrical circuit (6) comprises a charging status monitor (66) for a battery (4).

6. In a lighting system in accordance with claim 1 further comprising a tail light (52) connected to the electrical circuit, said tail light (52) comprising a plurality of planar-disposed light-emitting diodes.

7. In a lighting system in accordance with claim 1, wherein all of said electrical energy consumers are switched by a master switch (67) in the electrical circuit (6).

8. In a lighting system in accordance with claim 1, wherein the propeller (3) is foldable in a state of rest.

9. In a lighting system in accordance with claim 1, wherein the dynamo (2) and the electrical circuit (6) are located in a housing (10).

10. In a lighting system in accordance with claim 9 further comprising a quick release for the releasable mounting of the housing (10) on one of a bicycle frame (13) and a holder (12).

* * * * *